(12) United States Patent
Tsuda et al.

(10) Patent No.: US 12,526,005 B2
(45) Date of Patent: Jan. 13, 2026

(54) RADIO-FREQUENCY MODULE AND COMMUNICATION DEVICE

(71) Applicant: Murata Manufacturing Co., Ltd., Kyoto (JP)

(72) Inventors: Motoji Tsuda, Kyoto (JP); Mikiko Fukasawa, Kyoto (JP); Shunji Yoshimi, Kyoto (JP); Satoshi Goto, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 351 days.

(21) Appl. No.: 18/323,626

(22) Filed: May 25, 2023

(65) Prior Publication Data

US 2023/0299804 A1     Sep. 21, 2023

Related U.S. Application Data

(63) Continuation of application No. PCT/JP2021/044353, filed on Dec. 2, 2021.

(30) Foreign Application Priority Data

Dec. 11, 2020   (JP) ................ 2020-205905

(51) Int. Cl.
*H04B 1/38*     (2015.01)
*H01Q 1/22*     (2006.01)

(52) U.S. Cl.
CPC ............. *H04B 1/38* (2013.01); *H01Q 1/2283* (2013.01)

(58) Field of Classification Search
CPC .......... H04B 1/38; H04B 1/00; H01Q 1/2283; H01L 23/00; H01L 25/04; H01L 25/18
See application file for complete search history.

(56) References Cited

U.S. PATENT DOCUMENTS 5,869,894 A * 2/1999 Degani ............... H01L 23/5385
                                                                 257/723
7,167,688 B2 * 1/2007 Li ........................... H04B 1/38
                                                                 455/107

(Continued)

FOREIGN PATENT DOCUMENTS

JP    2005-235825 A    9/2005
WO   2020/071021 A1   4/2020

OTHER PUBLICATIONS

International Search Report for PCT/JP2021/044353 dated Feb. 22, 2022.

*Primary Examiner* — Santiago Garcia

(74) *Attorney, Agent, or Firm* — McDonald Hopkins LLC

(57) ABSTRACT

A radio-frequency module includes a module substrate that has a principal surface, an integrated circuit on the principal surface that includes a power amplifier circuit, and an SMD on the principal surface that includes a circuit device directly connected to the power amplifier circuit. The integrated circuit includes a first base that has at least a part formed of a first semiconductor material, and a second base that has at least a part formed of a second semiconductor material and that includes the power amplifier circuit. The first base has two sides that are opposite each other in plan view. The SMD is closer to one side than the other side in plan view. In plan view, the second base is smaller than the first base and is overlain by the first base at a position closer to the one side than to the other side.

16 Claims, 5 Drawing Sheets

(56) References Cited

U.S. PATENT DOCUMENTS

| | | | | |
|---|---|---|---|---|
| 7,514,774 | B2* | 4/2009 | Leung | H01L 23/552 |
| | | | | 257/691 |
| 8,750,810 | B2* | 6/2014 | Pletcher | H03F 1/56 |
| | | | | 330/144 |
| 9,159,743 | B2* | 10/2015 | Crandall | H10D 86/215 |
| 9,245,989 | B2* | 1/2016 | Then | H01L 21/283 |
| 2005/0180122 | A1* | 8/2005 | Okabe | H01L 23/66 |
| | | | | 257/E25.011 |
| 2009/0189269 | A1* | 7/2009 | Leung | H01L 23/5387 |
| | | | | 257/690 |
| 2012/0280755 | A1* | 11/2012 | Wright | H03F 3/211 |
| | | | | 330/307 |
| 2016/0181175 | A1* | 6/2016 | Ikeda | H01L 23/42 |
| | | | | 438/109 |
| 2016/0379944 | A1* | 12/2016 | Zampardi, Jr. | H10D 84/401 |
| | | | | 257/197 |
| 2017/0338847 | A1* | 11/2017 | Reisner | H04W 72/0453 |
| 2018/0131385 | A1* | 5/2018 | Aoki | G09G 3/20 |
| 2021/0151397 | A1 | 5/2021 | Naniwa et al. | |

* cited by examiner

RADIO-FREQUENCY MODULE AND COMMUNICATION DEVICE

CROSS REFERENCE TO RELATED APPLICATION

This is a continuation of International Application No. PCT/JP2021/044353 filed on Dec. 2, 2021 which claims priority from Japanese Patent Application No. 2020-205905 filed on Dec. 11, 2020. The contents of these applications are incorporated herein by reference in their entireties.

BACKGROUND ART

Technical Field

The present disclosure relates to a radio-frequency module and a communication device.

Mobile communication devices such as a cellular phone have more complicated arrangement configurations of circuit devices, which are included in radio-frequency front-end circuits, particularly with advances in multiband technology.

The radio-frequency module described in Patent Document 1 achieves a reduction in size of the radio-frequency module by stacking controllers above power amplifiers disposed on a packaging substrate.

Patent Document 1: U.S. Patent Application Publication No. 2017/0338847

BRIEF SUMMARY

However, in the related art described above, when a lower base (hereinafter referred to as a second base), in which the power amplifiers are formed, is smaller than an upper base (hereinafter referred to as a first base), wiring, which connects the power amplifiers to other circuit devices, may be extended.

Accordingly, the present disclosure provides a radio-frequency module and a communication device which achieve a reduction of the length of wiring connecting a circuit device to a power amplifier circuit included in a second base, which is disposed so as to be overlain by a first base.

A radio-frequency module according to an aspect of the present disclosure includes a module substrate that has a principal surface, an integrated circuit that is disposed on the principal surface and that includes a power amplifier circuit, and an electronic component that is disposed on the principal surface and that includes a circuit device directly connected to the power amplifier circuit. The integrated circuit includes a first base that has at least a part formed of a first semiconductor material, and a second base that has at least a part formed of a second semiconductor material different from the first semiconductor material and that includes the power amplifier circuit. The first base has a first side and a second side that are opposite each other in plan view. The electronic component is closer to the first side than to the second side in plan view. In plan view, the second base is smaller than the first base and is overlain by the first base at a position closer to the first side than to the second side.

The radio-frequency module according to the aspect of the present disclosure achieves a reduction of the length of wiring connecting a circuit device to a power amplifier circuit included in a second base, which is disposed so as to be overlain by a first base.

DETAILED DESCRIPTION

Figure 1:
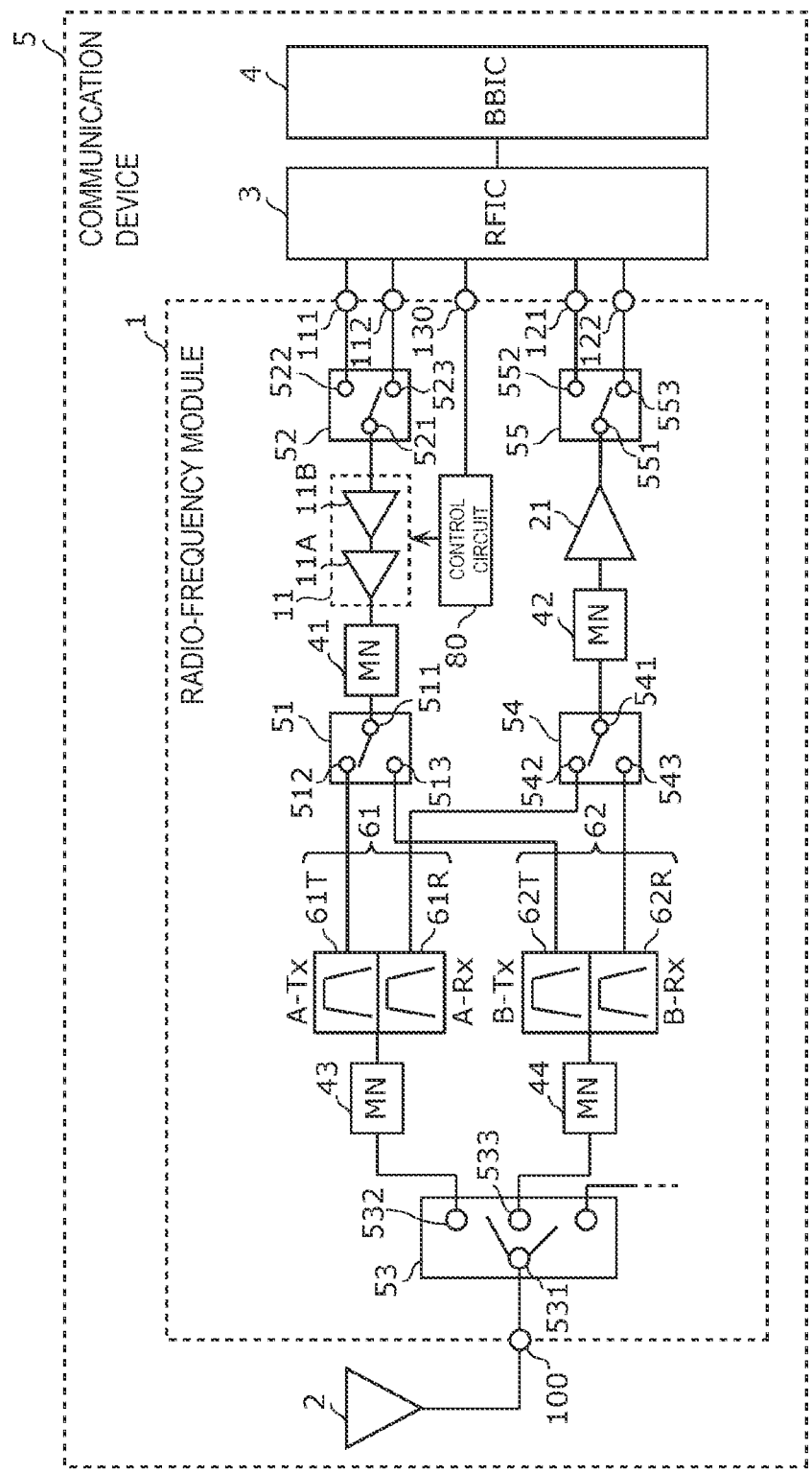
FIG. 1 is a diagram illustrating the circuit configuration of a radio-frequency module and a communication device according to an embodiment.

Embodiments of the present disclosure will be described below in detail by using the drawings. Each embodiment described below is a comprehensive or concrete example. The numeral values, the shapes, the materials, the components, the layout and the connection form of components, and the like described in the embodiments described below are exemplary, and are not intended to limit the present disclosure.

The figures are schematic views with appropriate emphasis, abbreviation, or adjustment of ratios for illustration of the present disclosure, and are not necessarily illustrated strictly. The shapes, the positional relationship, and the ratios may be different from the actual ones. In the figures, substantially the same configurations are designated with the same reference numerals. Repeated description may be skipped or simplified.

In the figures described below, x axis and y axis are orthogonal to each other in a plane parallel to a principal surface of a module substrate. Specifically, when a module substrate is rectangular in plan view, x axis is parallel to a first side of the module substrate; y axis is parallel to a second side orthogonal to the first side of the module substrate. In addition, z axis is perpendicular to the principal surface of the module substrate. The positive direction of z axis indicates the upward direction; its negative direction indicates the downward direction.

In a circuit configuration in the present disclosure, "to be connected" encompasses, not only the case of direct connection using a connection terminal and/or a wiring conductor, but also the case of electrical connection via other circuit devices. "To be directly connected" means direct connection using a connection terminal and/or a wiring conductor not through other circuit devices. "To be connected between A and B" means connection, between A and B, to both A and B, and, in addition to connection in series to a path connecting A to B, encompasses connection between the path and the ground.

In a component layout in the present disclosure, "in plan view" means viewing an object subjected to orthogonal projection to the xy plane from the z-axis positive side. "In plan view, A overlaps/overlies B" means that the area of A subjected to orthogonal projection to the xy plane overlaps/overlies the area of B subjected to orthogonal projection to the xy plane. "A is disposed between B and C" means that at least one of line segments connecting any points in B to any points in C passes through A. Terms indicating the relationships between components, such as "parallel" and "perpendicular", terms indicating the shapes of components, such as "rectangular", and numeral ranges are not intended to have only strict meaning, and mean substantially equivalent ranges, for example, having errors in the order of a few percent.

In addition to placement of a component on a substrate in the state in which the component is in contact with the substrate, "to dispose a component on/in a substrate" encompasses placement of a component above a substrate in the state in which the component is not in contact with the substrate (for example, the component is laminated on another component disposed on the substrate), and placement of a component in the state in which a part or the entirety of the component is embedded in the substrate. In addition to placement of a component on a principal surface of a substrate in the state in which the component is in contact with the principal surface, "to dispose a component on a principal surface of a substrate" encompasses placement of a component above a principal surface in the state in which the component is not in contact with the principal surface, and placement of a component in the state in which a part of the component is embedded in a substrate from the principal surface side.

In a material composition described in the present disclosure, "object A is formed of material B" means that the main component of A is B. The main component means a component having the largest weight ratio among the multiple components contained by an object.

EMBODIMENT 1.1 The Circuit Configuration of a Radio-Frequency Module 1 and a Communication Device 5

The circuit configuration, according to the present embodiment, of a radio-frequency module 1 and a communication device 5, which includes the radio-frequency module 1, will be described by referring to FIG. 1. FIG. 1 is a diagram illustrating the circuit configuration of the radio-frequency module 1 and the communication device 5 according to the embodiment.

1.1.1 The Circuit Configuration of the Communication Device 5

As illustrated in FIG. 1, the communication device 5 according to the present embodiment includes the radio-frequency module 1, an antenna 2, an RFIC (Radio Frequency Integrated Circuit) 3, and a BBIC (Baseband Integrated Circuit) 4.

The radio-frequency module 1 transports radio-frequency signals between the antenna 2 and the RFIC 3. The internal configuration of the radio-frequency module 1 will be described below.

The antenna 2, which is connected to an antenna connection terminal 100 of the radio-frequency module 1, receives radio-frequency signals from the outside, and outputs the radio-frequency signals to the radio-frequency module 1.

The RFIC 3 is an exemplary signal processing circuit which processes radio-frequency signals. Specifically, the RFIC 3 performs signal processing such as down-converting on radio-frequency receive signals received through the receive paths of the radio-frequency module 1, and outputs, to the BBIC 4, the receive signals generated through the signal processing. In addition, the RFIC 3 has a controller which controls, for example, switching circuits and amplifier circuits which are included in the radio-frequency module 1. Some or all of the functions, as a controller, of the RFIC 3 may be included in a component which is present outside the RFIC 3, and may be included, for example, in the BBIC 4 or the radio-frequency module 1.

The BBIC 4 is a baseband signal processing circuit which performs signal processing using an intermediate frequency band whose frequency is lower than that of radio-frequency signals transported by the radio-frequency module 1. Signals processed by the BBIC 4 are, for example, image signals for image display and/or voice signals for calls through a speaker.

In the communication device 5 according to the present embodiment, the antenna 2 and the BBIC 4 are optional components.

1.1.2 The Circuit Configuration of the Radio-Frequency Module 1

The circuit configuration of the radio-frequency module 1 will be described. As illustrated in FIG. 1, the radio-frequency module 1 includes a power amplifier circuit 11, a low-noise amplifier circuit 21, impedance matching circuits (MNs) 41 to 44, switching circuits 51 to 55, duplexer circuits 61 and 62, a control circuit 80, the antenna connection terminal 100, radio-frequency input terminals 111 and 112, radio-frequency output terminals 121 and 122, and a control terminal 130.

The antenna connection terminal 100 is connected, outside the radio-frequency module 1, to the antenna 2.

Each of the radio-frequency input terminals 111 and 112 is an input terminal for receiving radio-frequency transmit signals from the outside of the radio-frequency module 1. In the present embodiment, the radio-frequency input terminals 111 and 112 are connected, outside the radio-frequency module 1, to the RFIC 3.

Each of the radio-frequency output terminals 121 and 122 is an output terminal for providing radio-frequency receive signals to the outside of the radio-frequency module 1. In the present embodiment, the radio-frequency output terminals 121 and 122 are connected, outside the radio-frequency module 1, to the RFIC 3.

The control terminal 130 is a terminal for transporting a control signal. That is, the control terminal 130 is a terminal for receiving a control signal from the outside of the radio-frequency module 1 and/or a terminal for supplying a control signal to the outside of the radio-frequency module 1. The control signal is related to control of an electronic component included in the radio-frequency module 1. Specifically, the control signal is a digital signal for controlling, for example, the power amplifier circuit 11, the low-noise amplifier circuit 21, the switching circuits 51 to 55, or any combination of these.

The power amplifier circuit 11 is capable of amplifying transmit signals in Band A and Band B. The power amplifier circuit 11 is connected, at its input end, to the radio-frequency input terminals 111 and 112 through the switching circuit 52. The power amplifier circuit 11 is connected, at its output end, to transmit-filter circuits 61T and 62T through the impedance matching circuit 41 and the switching circuit 51.

The power amplifier circuit 11 is supplied with power from a power supply, and is a circuit for obtaining an output signal having energy larger than that of an input signal (transmit signal) on the basis of the supplied power. The power amplifier circuit 11 includes an amplifier transistor, and may include, for example, an inductor and/or a capacitor.

According to the present embodiment, the power amplifier circuit 11, which is a multistage amplifier circuit, includes power amplifiers 11A and 11B. The power amplifier 11A corresponds to the output stage of the power amplifier circuit 11. The power amplifier 11A is connected between the power amplifier 11B and the switching circuit 51.

Specifically, the power amplifier 11A is connected, at its input end, to the output end of the power amplifier 11B. The power amplifier 11A is connected, at its output end, to the impedance matching circuit 41.

The power amplifier 11B corresponds to the input stage of the power amplifier circuit 11. The power amplifier 11B is connected between the switching circuit 52 and the power amplifier 11A. Specifically, the power amplifier 11B is connected, at its input end, to the switching circuit 52. The power amplifier 11B is connected, at its output end, to the input end of the power amplifier 11A.

The configuration of the power amplifier circuit 11 is not limited to the configuration described above. For example, the power amplifier circuit 11 may be a single-stage amplifier circuit, or may be a differential amplifier circuit or a Doherty amplifier circuit.

The low-noise amplifier circuit 21 is capable of amplifying receive signals in Band A and Band B. The low-noise amplifier circuit 21 is connected, at its input end, to receive-filter circuits 61R and 62R through the impedance matching circuit 42 and the switching circuit 54. The low-noise amplifier circuit 21 is connected, at its output end, to the radio-frequency output terminals 121 and 122 through the switching circuit 55.

The impedance matching circuit 41 is connected to the output end of the power amplifier circuit 11, and is connected to the input ends of the transmit-filter circuits 61T and 62T through the switching circuit 51. The impedance matching circuit 41 is capable of achieving impedance matching between the output impedance of the power amplifier circuit 11 and the input impedance of the switching circuit 51.

The impedance matching circuit 42 is connected to the input end of the low-noise amplifier circuit 21, and is connected to the output ends of the receive-filter circuits 61R and 62R through the switching circuit 54. The impedance matching circuit 42 is capable of achieving impedance matching between the output impedance of the switching circuit 54 and the input impedance of the low-noise amplifier circuit 21.

The impedance matching circuit 43 is connected to the output end of the transmit-filter circuit 61T and the input end of the receive-filter circuit 61R, and is connected to the antenna connection terminal 100 through the switching circuit 53. The impedance matching circuit 43 is capable of achieving impedance matching between the switching circuit 53 and the duplexer circuit 61.

The impedance matching circuit 44 is connected to the output end of the transmit-filter circuit 62T and the input end of the receive-filter circuit 62R, and is connected to the antenna connection terminal 100 through the switching circuit 53. The impedance matching circuit 44 is capable of achieving impedance matching between the switching circuit 53 and the duplexer circuit 62.

The switching circuit 51, which is an exemplary first switching circuit, is connected between the output end of the power amplifier circuit 11 and the input ends of the transmit-filter circuits 61T and 62T. The switching circuit 51 has terminals 511 to 513. The terminal 511 is connected to the output end of the power amplifier circuit 11 through the impedance matching circuit 41. The terminal 512 is connected to the input end of the transmit-filter circuit 61T. The terminal 513 is connected to the input end of the transmit-filter circuit 62T.

In this connection configuration, the switching circuit 51 is capable of connecting the terminal 511 to any of the terminals 512 and 513, for example, on the basis of a control signal from the RFIC 3. That is, the switching circuit 51 is capable of switching, between the transmit-filter circuits 61T and 62T, connection to the output end of the power amplifier circuit 11. The switching circuit 51 is formed, for example, by using an SPDT (Single-Pole Double-Throw) switch, and may be called a band select switch.

The switching circuit 52, which is an exemplary second switching circuit, is connected between the radio-frequency input terminals 111 and 112 and the input end of the power amplifier circuit 11. The switching circuit 52 has terminals 521 to 523. The terminal 521 is connected to the input end of the power amplifier circuit 11. The terminals 522 and 523 are connected to the radio-frequency input terminals 111 and 112, respectively.

In this connection configuration, the switching circuit 52 is capable of connecting the terminal 521 to any of the terminals 522 and 523, for example, on the basis of a control signal from the RFIC 3. That is, the switching circuit 52 is capable of switching, between the radio-frequency input terminals 111 and 112, connection to the input end of the power amplifier circuit 11. The switching circuit 52 is formed, for example, by using an SPDT switch, and may be called an in-switch.

The switching circuit 53, which is an exemplary third switching circuit, is connected between the antenna connection terminal 100 and the duplexer circuits 61 and 62. The switching circuit 53 has terminals 531 to 533. The terminal 531 is connected to the antenna connection terminal 100. The terminal 532 is connected to the output end of the transmit-filter circuit 61T and the input end of the receive-filter circuit 61R through the impedance matching circuit 43. The terminal 533 is connected to the output end of the transmit-filter circuit 62T and the input end of the receive-filter circuit 62R through the impedance matching circuit 44.

In this connection configuration, the switching circuit 53 is capable of connecting the terminal 531 to one or both of the terminals 532 and 533, for example, on the basis of a control signal from the RFIC 3. That is, the switching circuit 53 is capable of switching between connection and disconnection between the antenna connection terminal 100 and the duplexer circuit 61, and is capable of switching between connection and disconnection between the antenna connection terminal 100 and the duplexer circuit 62. The switching circuit 53 is formed, for example, by using a multi-connection switch, and may be called an antenna switch.

The switching circuit 54 is connected between the input end of the low-noise amplifier circuit 21 and the output ends of the receive-filter circuits 61R and 62R. The switching circuit 54 has terminals 541 to 543. The terminal 541 is connected to the input end of the low-noise amplifier circuit 21 through the impedance matching circuit 42. The terminal 542 is connected to the output end of the receive-filter circuit 61R. The terminal 543 is connected to the output end of the receive-filter circuit 62R.

In this connection configuration, the switching circuit 54 is capable of connecting the terminal 541 to any of the terminals 542 and 543, for example, on the basis of a control signal from the RFIC 3. That is, the switching circuit 54 is capable of switching, between the receive-filter circuits 61R and 62R, connection to the input end of the low-noise amplifier circuit 21. The switching circuit 54 is formed, for example, by using an SPDT switch.

The switching circuit 55 is connected between the radio-frequency output terminals 121 and 122 and the output end of the low-noise amplifier circuit 21. The switching circuit 55 has terminals 551 to 553. The terminal 551 is connected to the output end of the low-noise amplifier circuit 21. The terminals 552 and 553 are connected to the radio-frequency output terminals 121 and 122, respectively.

In this connection configuration, the switching circuit 55 is capable of connecting the terminal 551 to any of the terminals 552 and 553, for example, on the basis of a control signal from the RFIC 3. That is, the switching circuit 55 is capable of switching, between the radio-frequency output terminals 121 and 122, connection to the output end of the low-noise amplifier circuit 21. The switching circuit 55 is formed, for example, by using an SPDT switch, and may be called an out-switch.

The duplexer circuit 61 is capable of passing radio-frequency signals in Band A. The duplexer circuit 61 transports transmit signals and receive signals in Band A by using an FDD (Frequency Division Duplex) system. The duplexer circuit 61 includes the transmit-filter circuit 61T and the receive-filter circuit 61R.

The transmit-filter circuit 61T (A-Tx) has a passband including the uplink operating band of Band A. Thus, the transmit-filter circuit 61T is capable of passing transmit signals in Band A. The transmit-filter circuit 61T is connected between the power amplifier circuit 11 and the antenna connection terminal 100. Specifically, the transmit-filter circuit 61T is connected, at its input end, to the output end of the power amplifier circuit 11 through the switching circuit 51 and the impedance matching circuit 41. In contrast, the transmit-filter circuit 61T is connected, at its output end, to the antenna connection terminal 100 through the impedance matching circuit 43 and the switching circuit 53.

The receive-filter circuit 61R (A-Rx) has a passband including the downlink operating band of Band A. Thus, the receive-filter circuit 61R is capable of passing receive signals in Band A. The receive-filter circuit 61R is connected between the antenna connection terminal 100 and the low-noise amplifier circuit 21. Specifically, the receive-filter circuit 61R is connected, at its input end, to the antenna connection terminal 100 through the impedance matching circuit 43 and the switching circuit 53. In contrast, the receive-filter circuit 61R is connected, at its output end, to the low-noise amplifier circuit 21 through the switching circuit 54 and the impedance matching circuit 42.

The duplexer circuit 62 is capable of passing radio-frequency signals in Band B. The duplexer circuit 62 transports transmit signals and receive signals in Band B by using an FDD system. The duplexer circuit 62 includes the transmit-filter circuit 62T and the receive-filter circuit 62R.

The transmit-filter circuit 62T (B-Tx) has a passband including the uplink operating band of Band B. Thus, the transmit-filter circuit 62T is capable of passing transmit signals in Band B. The transmit-filter circuit 62T is connected between the power amplifier circuit 11 and the antenna connection terminal 100. Specifically, the transmit-filter circuit 62T is connected, at its input end, to the output end of the power amplifier circuit 11 through the switching circuit 51 and the impedance matching circuit 41. In contrast, the transmit-filter circuit 62T is connected, at its output end, to the antenna connection terminal 100 through the impedance matching circuit 44 and the switching circuit 53.

The receive-filter circuit 62R (B-Rx) has a passband including the downlink operating band of Band B. Thus, the receive-filter circuit 62R is capable of passing receive signals in Band B. The receive-filter circuit 62R is connected between the antenna connection terminal 100 and the low-noise amplifier circuit 21. Specifically, the receive-filter circuit 62R is connected, at its input end, to the antenna connection terminal 100 through the impedance matching circuit 44 and the switching circuit 53. In contrast, the receive-filter circuit 62R is connected, at its output end, to the low-noise amplifier circuit 21 through the switching circuit 54 and the impedance matching circuit 42.

The control circuit 80 is a power amplifier controller which controls the power amplifier circuit 11. The control circuit 80 receives a control signal from the RFIC 3 through the control terminal 130, and outputs a control signal to the power amplifier circuit 11.

One or more circuits among the circuits illustrated in FIG. 1 are not necessarily included in the radio-frequency module 1. For example, the radio-frequency module 1 may have any configuration as long as the radio-frequency module 1 includes at least the power amplifier circuit 11, and does not necessarily include the other circuits.

1.2 The Component Layout of the Radio-Frequency Module 1

An exemplary component layout of the radio-frequency module 1 having the configuration described above will be described specifically by referring to FIGS. 2 and 3.

Figure 2:
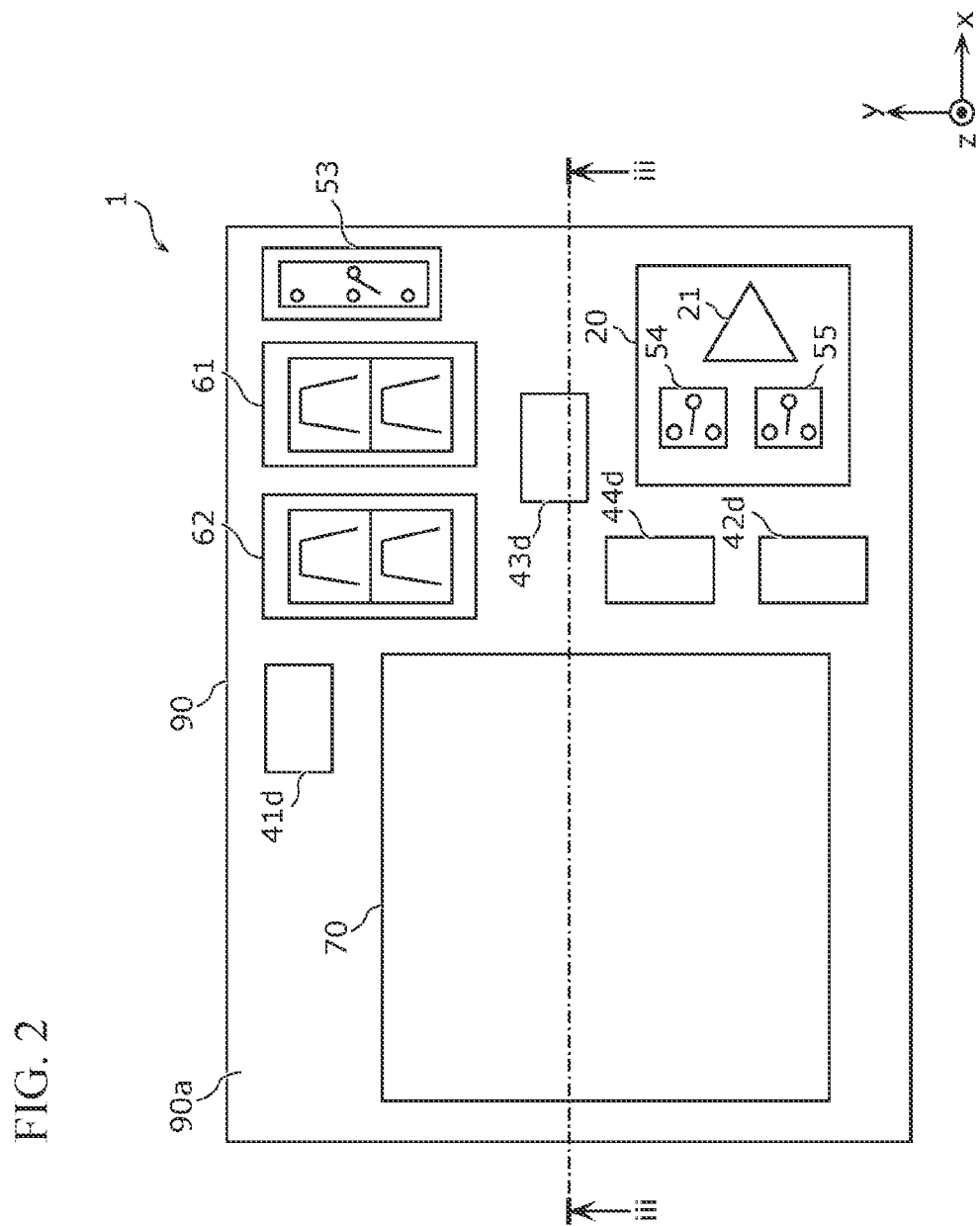
FIG. 2 is a plan view of a radio-frequency module according to an embodiment.

FIG. 2 is a plan view of the radio-frequency module 1 according to the embodiment. FIG. 3 is a cross-sectional view of the radio-frequency module 1 according to the embodiment. The cross section of the radio-frequency module 1 in FIG. 3 corresponds to the cross section along line iii-iii in FIG. 2.

In addition to the components included in the circuit illustrated in FIG. 1, the radio-frequency module 1 further includes a module substrate 90, a resin member 91, a shield electrode layer 92, and multiple external connection terminals 150. In FIG. 2, the resin member 91 and the shield electrode layer 92 are not illustrated. In FIGS. 2 and 3, wiring connecting, to each other, components disposed on the module substrate 90 is not illustrated.

The module substrate 90 has principal surfaces 90a and 90b which are opposite each other. In the present embodiment, the module substrate 90 is rectangular in plan view, but the shape of the module substrate 90 is not limited to this. The module substrate 90 may be, for example, an LTCC (Low Temperature Co-fired Ceramics) substrate or an HTCC (High Temperature Co-fired Ceramics) substrate, which has a layered structure of multiple dielectric layers, a component-embedded substrate, a substrate having an RDL (Redistribution Layer), or a printed board. However, the module substrate 90 is not limited to these.

Integrated circuits 20 and 70, SMDs (Surface Mount Devices) 41d to 44d, the switching circuit 53, and the duplexer circuits 61 and 62 are disposed on the principal surface 90a. The principal surface 90a and the components on the principal surface 90a are covered by the resin member 91.

The integrated circuit 20 includes the low-noise amplifier circuit 21 and the switching circuits 54 and 55. The integrated circuit 20 may be formed, for example, by using a CMOS (Complementary Metal Oxide Semiconductor), and may be specifically manufactured through a SOI (Silicon on Insulator) process. This enables the integrated circuit 20 to be manufactured at low cost. The integrated circuit 20 may be formed of at least one of the following materials: gallium arsenide (GaAs); silicon germanium (SiGe); and gallium nitride (GaN). This enables a high-quality low-noise amplifier circuit 21 and high-quality switching circuits 54 and 55 to be implemented.

The integrated circuit 70 includes a first base 71 and a second base 72. The second base 72 and the first base 71 are laminated in this sequence from the principal surface 90a side of the module substrate 90. The details of the integrated circuit 70 will be described below by using FIGS. 4 to 6.

In each of the SMDs 41*d* to 44*d*, an impedance matching device, which forms the corresponding one of the impedance matching circuits 41 to 44, is formed. In particular, in the SMD 41*d*, an impedance matching device, which is directly connected to the output end of the power amplifier circuit 11, is formed. An impedance matching device may be, for example, an inductor and/or a capacitor. However, the configuration is not limited to this. An electronic component, which includes an impedance matching device, is not limited to an SMD. For example, instead of an SMD, an IPD (Integrated Passive Device) may be used. In addition, the impedance matching devices which form the impedance matching circuit 41 to 44 may be formed in the module substrate 90.

The switching circuit 53 is formed, for example, by using multiple MOSFETs (Metal-Oxide-Semiconductor Field-Effect Transistors) which are connected to each other in series. The number of stages in series connection of the MOSFETs may be any as long as the number is determined in accordance with a required withstand voltage, and has no particular limitation.

Each of the duplexer circuits 61 and 62 may be formed, for example, by using any of a SAW (Surface Acoustic Wave) filter, a BAW (Bulk Acoustic Wave) filter, an LC resonant filter, and a dielectric filter. Further, the configuration is not limited to these.

The resin member 91 covers the principal surface 90*a* and the components on the principal surface 90*a*. The resin member 91 has a function of ensuring reliability of mechanical strength, moisture resistance, and the like of the components on the principal surface 90*a*. The resin member 91 is not necessarily included in the radio-frequency module 1.

The shield electrode layer 92, which is, for example, a thin metal film formed by using a sputtering method, is formed so as to cover the top surface and the side surfaces of the resin member 91 and the side surfaces of the module substrate 90. The shield electrode layer 92 is set to the ground potential, and suppresses invasion of external noise into components included in the radio-frequency module 1.

The external connection terminals 150 are disposed on the principal surface 90*b*. The external connection terminals 150 include the antenna connection terminal 100, the radio-frequency input terminals 111 and 112, the radio-frequency output terminals 121 and 122, and the control terminal 130 which are illustrated in FIG. 1, as well as ground terminals. Each of the external connection terminals 150 is joined, for example, to an input/output terminal and/or a ground terminal on a mother board disposed in the z-axis negative direction of the radio-frequency module 1. The external connection terminals 150 may be, for example, bump electrodes, but the configuration is not limited to this.

Figure 3:
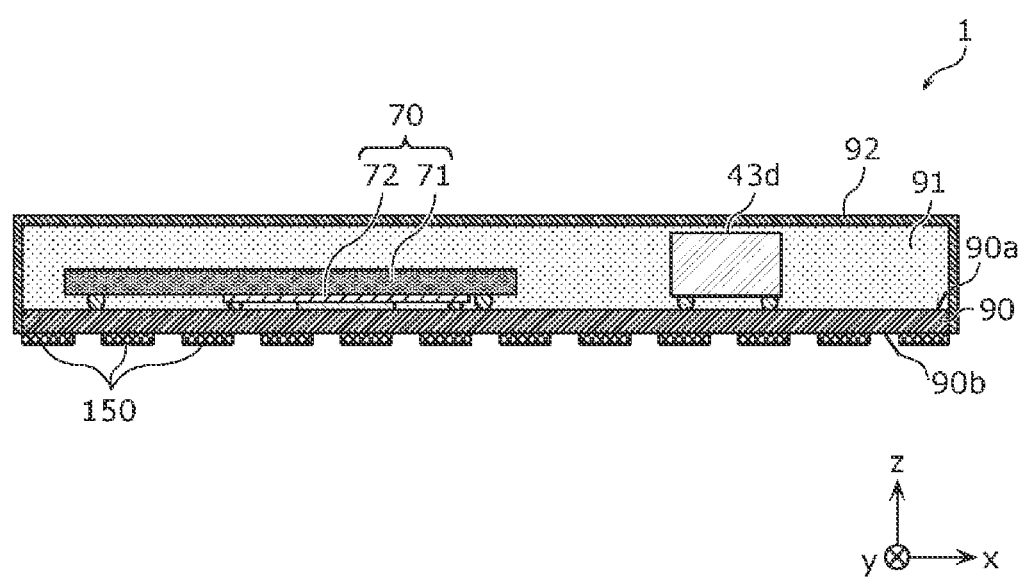
FIG. 3 is a cross-sectional view of a radio-frequency module according to an embodiment.

The component layout illustrated in FIGS. 2 and 3 is exemplary, and the layout is not limited to this. For example, some or all of the components may be disposed on the principal surface 90*b* of the module substrate 90. In this case, the principal surface 90*b* and the components on the principal surface 90*b* may be covered by a resin member.

1.3 The Configuration of the Integrated Circuit 70

The configuration of the integrated circuit 70 will be described by referring to FIGS. 4 to 6.

Figure 4:
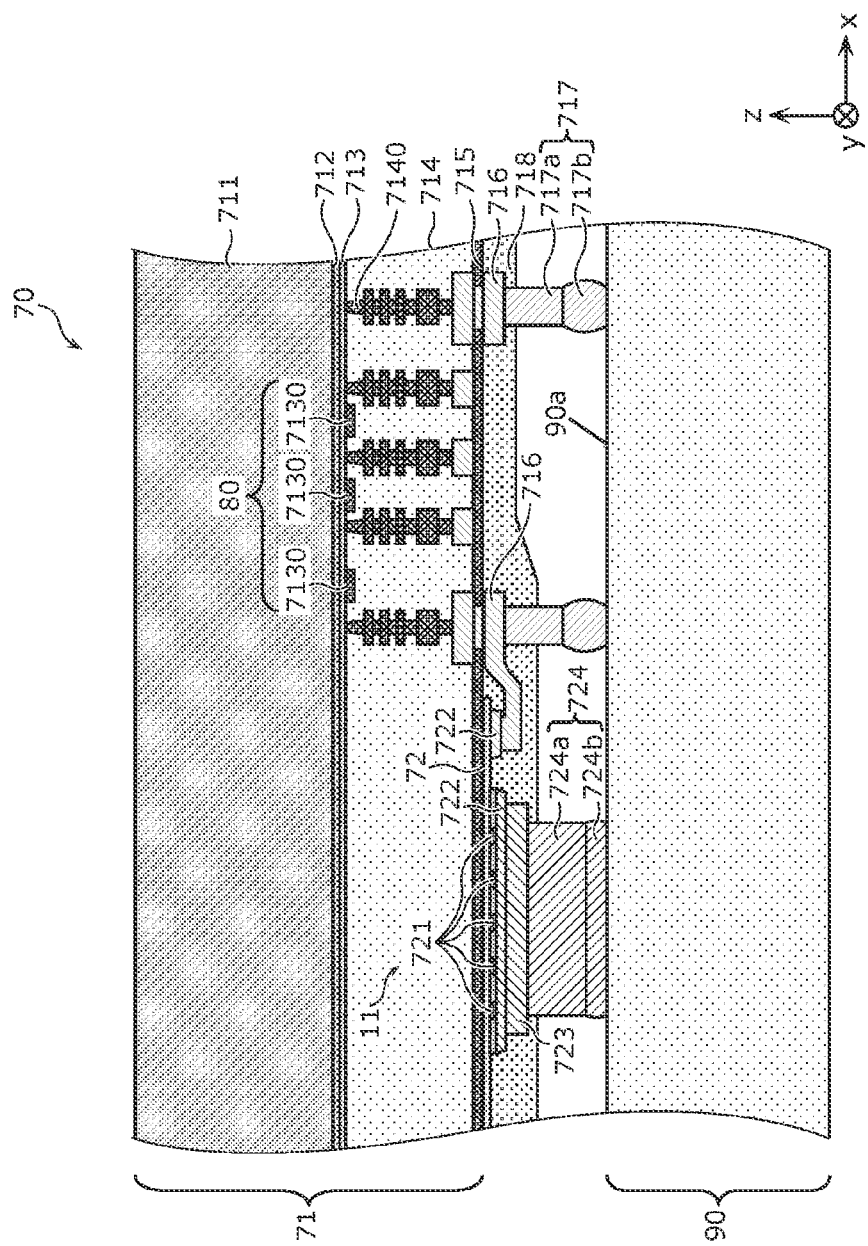
FIG. 4 is a partial cross-sectional view of a radio-frequency module according to an embodiment.
Figure 5:
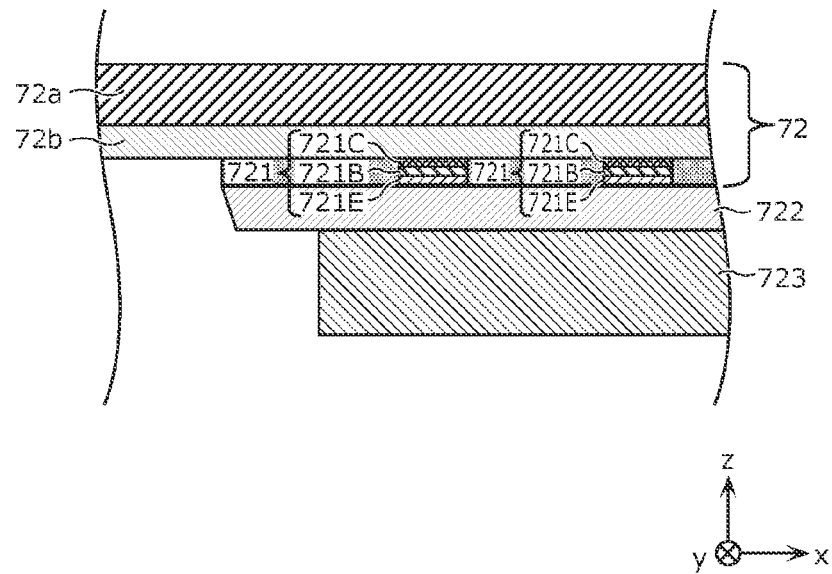
FIG. 5 is a partial cross-sectional view of a radio-frequency module according to an embodiment.
Figure 6:
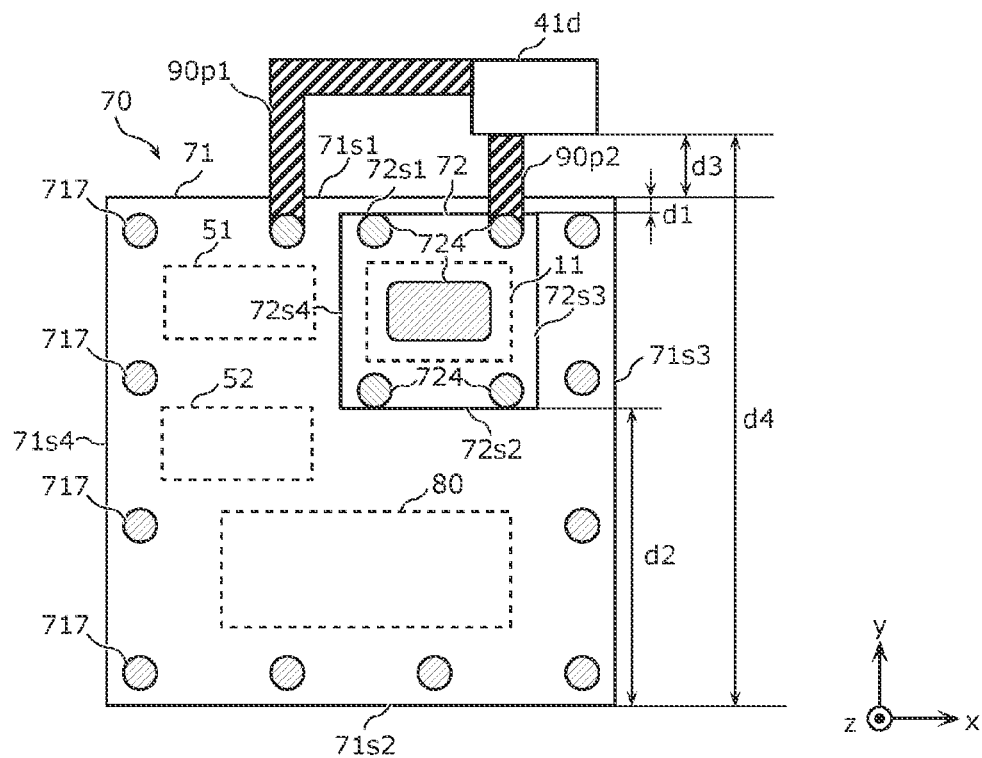
FIG. 6 is a partial plan view of a radio-frequency module according to an embodiment.

FIGS. 4 and 5 are partial cross-sectional views of the radio-frequency module 1 according to the embodiment. Specifically, FIG. 4 is an enlarged cross-sectional view of the integrated circuit 70. FIG. 5 is an enlarged cross-sectional view of the second base 72. In FIGS. 4 and 5, not all the wiring and electrodes are illustrated.

As illustrated in FIG. 4, the integrated circuit 70 includes the first base 71 and the second base 72.

1.3.1 The Configuration of the First Base 71

The first base 71 will be described. At least a part of the first base 71 is formed of a first semiconductor material. In this example, the first semiconductor material is silicon (Si). The first semiconductor material is not limited to silicon. For example, the first semiconductor material may be a material containing, as the main component, any of gallium arsenide, aluminum arsenide (AlAs), indium arsenide (InAs), indium phosphide (InP), gallium phosphide (GaP), indium antimonide (InSb), gallium nitride, indium nitride (InN), aluminum nitride (AlN), silicon, germanium (Ge), silicon carbide (SiC), and gallium oxide (III) ($Ga_2O_3$), or a material containing, as the main component, a multicomponent mixed-crystal material composed of more than one of these materials. However, the first semiconductor material is not limited to these.

The switching circuits 51 and 52 and the control circuit 80 are formed in the first base 71. The electric circuits formed in the first base 71 are not limited to the switching circuits 51 and 52 and the control circuit 80. For example, only either one or some of the switching circuits 51 and 52 and the control circuit 80 may be formed in the first base 71. In addition, a control circuit (not illustrated) which controls the switching circuit 51 and/or the switching circuit 52 may be formed in the first base 71.

The first base 71 is a plate-like member including a silicon substrate 711, a silicon dioxide ($SiO_2$) layer 712, a silicon layer 713, a silicon dioxide layer 714, and a silicon nitride (SiN) layer 715. The silicon dioxide layer 712, the silicon layer 713, the silicon dioxide layer 714, and the silicon nitride layer 715 are laminated on the silicon substrate 711 in this sequence.

The silicon substrate 711 is formed, for example, of a silicon single crystal, and is used as a support substrate.

The silicon dioxide layer 712 is disposed on the silicon substrate 711, and is used as an insulating layer.

The silicon layer 713 is disposed on the silicon dioxide layer 712, and is used as a device layer. In the cross section in FIG. 4, multiple circuit devices 7130 which are included in the control circuit 80 are formed on the silicon layer 713.

The silicon dioxide layer 714 is disposed on the silicon layer 713, and is used as a wiring forming layer. In the silicon dioxide layer 714, wiring for connecting the control circuit 80 and the switching circuits 51 and 52, which are formed on the silicon layer 713, to electrodes 716, which are formed on a surface of the silicon nitride layer 715, is formed. This wiring includes multiple interconnect layers (not illustrated), and multiple via electrodes 7140 which connect the interconnect layers to each other. The interconnect layers and the via electrodes 7140 are formed, for example, of copper or aluminum.

The silicon nitride layer 715 is disposed on the silicon dioxide layer 714, and is used as a passivation layer. The electrodes 716 are formed as a redistribution layer on a part of a surface of the silicon nitride layer 715.

The electrodes 716 are joined to electrodes (not illustrated), which are disposed on the module substrate 90, with electrodes 717 interposed in between. The surfaces of the electrodes 716 are coated by a resin layer 718 which is an insulating film.

The electrodes 717, which are exemplary first electrodes, are disposed on the surface, which faces the second base 72, of the first base 71. Each of the electrodes 717 is an electrode which protrudes from the first base 71 toward the principal surface 90*a* of the module substrate 90, and is joined, at its leading end, to the principal surface 90a. Each of the electrodes 717 has a columnar conductor 717a and a bump electrode 717b. The bump electrode 717b is joined to an electrode (not illustrated) disposed on the principal surface 90a of the module substrate 90.

The first base 71 is not limited to the configuration in FIG. 4. For example, the first base 71 does not necessarily include one or some of the layers on the silicon substrate 711.

1.3.2 The Configuration of the Second Base 72

The second base 72 will be described. At least a part of the second base 72 is formed of a second semiconductor material different from the first semiconductor material. The second semiconductor material is a material having a thermal conductivity lower than the first semiconductor material, and is, for example, gallium arsenide. The second semiconductor material is not limited to gallium arsenide. For example, the second semiconductor material may be a material containing, as the main component, any of gallium arsenide, aluminum arsenide, indium arsenide, indium phosphide, gallium phosphide, indium antimonide, gallium nitride, indium nitride, aluminum nitride, silicon germanium, silicon carbide, gallium oxide (III), and gallium bismuth (GaBi), or a material containing, as the main component, a multicomponent mixed-crystal material composed of more than one of these materials. The second semiconductor material is not limited to these.

The second base 72 includes the power amplifier circuit 11. Specifically, the second base 72 includes multiple circuit devices 721, as well as electrodes (not illustrated) for applying voltages to the circuit devices 721 or electrodes (not illustrated) for supplying currents. The circuit devices 721 form, for example, heterojunction bipolar transistors (HBTs) in which multiple unit transistors are connected to each other in parallel, and are included in the power amplifier circuit 11.

The second base 72 includes a semiconductor layer 72a, an epitaxial layer 72b formed on a surface of the semiconductor layer 72a, the circuit devices 721, and electrodes 722 and 723. The semiconductor layer 72a is formed of the second semiconductor material, and is joined to the silicon nitride layer 715 of the first base 71. The semiconductor layer 72a is, for example, a GaAs layer. Each circuit device 721 has a collector layer 721C, a base layer 721B, and an emitter layer 721E. The collector layer 721C, the base layer 721B, and the emitter layer 721E are laminated on the epitaxial layer 72b in this sequence. That is, in each circuit device 721, the collector layer 721C, the base layer 721B, and the emitter layer 721E are laminated in this sequence from the first base 71 side.

For example, the collector layer 721C is formed of n-gallium arsenide. The base layer 721B is formed of p-gallium arsenide. The emitter layer 721E is formed of n-indium gallium phosphorus (InGaP). The emitter layer 721E is joined to the electrode 723 with an electrode 722 which is interposed in between and which is formed on the surface of the second base 72. The electrode 723 is joined to the principal surface 90a of the module substrate 90 with an electrode 724 interposed in between.

The electrode 724, which is an exemplary second electrode, is disposed on the surface, which is on the opposite side of the surface facing the first base 71, of the second base 72. The electrode 724 protrudes from the second base 72 toward the principal surface 90a of the module substrate 90, and is joined, at its leading end, to the principal surface 90a. The electrode 724 functions as a thermal-radiation path for heat generated by the power amplifier circuit 11. The electrode 724 has a columnar conductor 724a and a bump electrode 724b. The bump electrode 724b is joined to an electrode (not illustrated) disposed on the principal surface 90a of the module substrate 90.

The configuration of the second base 72 is not limited to that in FIGS. 4 and 5.

1.3.3 The Planar Layout of the First Base 71, the Second Base 72, and the SMD 41d The layout of the first base 71, the second base 72, and the SMD 41d in plan view will be described by referring to FIG. 6. FIG. 6 is a partial plan view of the radio-frequency module 1 according to the embodiment. In FIG. 6, the integrated circuit 70 is seen through; broken lines indicate the outlines of circuits and electrodes in the first base 71 and the second base 72. In FIG. 6, not all the wiring and electrodes are illustrated.

The first base 71 is rectangular with four sides 71s1 to 71s4. The sides 71s1 and 71s2, which are exemplary first and second sides, respectively, are opposite each other. The sides 71s3 and 71s4 are also opposite each other.

The second base 72, which is smaller than the first base 71, is rectangular with four sides 72s1 to 72s4. The sides 72s1 and 72s2 are opposite each other. The sides 72s3 and 72s4 are also opposite each other.

The second base 72 is closer to the side 71s1 of the first base 71 than to the side 71s2. That is, the distance d1 between the second base 72 and the side 71s1 is shorter than the distance d2 between the second base 72 and the side 71s2. The distance between an object and a side means the shortest distance between the object and the side.

The SMD 41d is closer to the side 71s1 of the first base 71 than to the side 71s2. That is, the distance d3 between the SMD 41d and the side 71s1 is shorter than the distance d4 between the SMD 41d and the side 71s2.

Multiple electrodes 717 are disposed along the edges of the first base 71. However, the electrodes 717 are not disposed between the side 71s1 of the first base 71 and the second base 72. The switching circuits 51 and 52 and the control circuit 80 are not disposed between the side 71s1 of the first base 71 and the second base 72. Each of the switching circuits 51 and 52 and the control circuit 80, which are formed in the first base 71, does not overlap the second base 72.

The electrodes 717 are disposed along the edges of the first base 71. One of the electrodes 717 is connected to the SMD 41d through a wiring pattern 90p1 included in the module substrate 90. In this state, the electrode 717 connected to the SMD 41d is disposed along the side 71s1. That is, the electrode 717 connected to the SMD 41d is closer to the side 71s1 than to the sides 71s2 to 71s4 among the four sides 71s1 to 71s4.

Multiple electrodes 724 are disposed along the edges of the second base 72, and the electrode 724 is disposed so as to be overlain by the power amplifier circuit 11. One of the electrodes 724 is connected to the SMD 41d through a wiring pattern 90p2 included in the module substrate 90. In this state, among the electrodes 724, the electrode 724, which is connected to the SMD 41d, is closer to the SMD 41d than the other electrodes 724 are.

The shapes and arrangement of the first base 71 and the second base 72, which are illustrated in FIGS. 2 to 6, are exemplary. The configuration is not limited to this. For example, the shapes of the first base 71 and the second base 72 are not necessarily rectangular.

1.4 Effects and the Like

As described above, the radio-frequency module 1 according to the present embodiment includes the module substrate 90, which has the principal surface 90a, the integrated circuit 70, which is disposed on the principal surface 90a and which includes the power amplifier circuit 11, and the SMD 41d, which is disposed on the principal surface 90a and which includes a circuit device directly connected to the power amplifier circuit 11. The integrated circuit 70 includes the first base 71, which has at least a part formed of the first semiconductor material, and the second base 72, which has at least a part formed of the second semiconductor material different from the first semiconductor material and which includes the power amplifier circuit 11. The first base 71 has the sides 71s1 and 71s2 which are opposite each other in plan view. The SMD 41d is closer to the side 71s1 than to the side 71s2 in plan view. The second base 72 is smaller than the first base 71 in plan view, and is overlain by the first base 71 at a position closer to the side 71s1 than to the side 71s2.

According to this configuration, the second base 72 is disposed close to the side 71s1, achieving a reduction of the length of wiring connecting the power amplifier circuit 11, which is included in the second base 72, and the circuit device included in the SMD 41d. Therefore, wiring loss and mismatching loss due to the stray capacitance of wiring may be reduced, achieving improvement of electrical characteristics (for example, transmission power efficiency) of the radio-frequency module 1.

In addition, for example, in the radio-frequency module 1 according to the present embodiment, an electric circuit(s) may be formed in the first base 71.

According to this configuration, the first base 71, which includes the electric circuit(s), overlies the second base 72, which includes the power amplifier circuit 11, in plan view. Thus, the integrated circuit 70 achieves contribution to a reduction in size of the radio-frequency module 1.

In addition, for example, in the radio-frequency module 1 according to the present embodiment, the electric circuit(s) are not necessarily disposed between the second base 72 and the side 71s1 of the first base 71 in plan view.

According to this configuration, the second base 72 may be disposed close to the side 71s1, achieving a further reduction of the length of wiring connecting the power amplifier circuit 11, included in the second base 72, to the circuit device included in the SMD 41d.

In addition, for example, in the radio-frequency module 1 according to the present embodiment, the electric circuit(s) may include at least one of the following circuits: the control circuit 80 controlling the power amplifier circuit 11; the switching circuit 51 connected to the output end of the power amplifier circuit 11; and the switching circuit 52 connected to the input end of the power amplifier circuit 11.

According to this configuration, at least one of the circuits, the control circuit 80 and the switching circuits 51 and 52 which are connected to the power amplifier circuit 11 included in the second base 72, is formed in the first base 71, achieving a reduction of the wiring length between the power amplifier circuit 11 and at least one of the circuits, the control circuit 80 and the switching circuits 51 and 52. This achieves a reduction of influence of digital noise due to a control signal, and achieves a reduction of wiring loss and mismatching loss due to the stray capacitance of wiring.

In addition, for example, in the radio-frequency module 1 according to the present embodiment, each of the electric circuit(s) does not necessarily overlap the second base 72 in plan view.

According to this configuration, thermal influence from the second base 72 to the electric circuit(s) may be weakened, and degradation of characteristics of the electric circuit(s) due to heat may be suppressed.

In addition, for example, in the radio-frequency module 1 according to the present embodiment, the first base 71 may have electrodes 717 disposed on the surface facing the second base 72.

According to this configuration, heat, which is generated by the power amplifier circuit 11 included in the second base 72, may be discharged to the module substrate 90 through the first base 71 and the electrodes 717, achieving suppression of degradation of characteristics of the power amplifier circuit 11 due to heat.

In addition, for example, the radio-frequency module 1 according to the present embodiment may have electrodes 717 along the edges of the first base 71, and the electrodes 717 are not necessarily disposed between the second base 72 and the side 71s1 of the first base 71.

According to this configuration, the second base 72 may be disposed much closer to the side 71s1, and the state in which electrodes 717 are interposed between the second base 72 and the SMD 41d may be avoided. This achieves suppression of the state in which wiring, which connects the power amplifier circuit 11 included in the second base 72 to the circuit device included in the SMD 41d, is extended in order to go around an electrode 717.

In addition, for example, in the radio-frequency module 1 according to the present embodiment, among the electrodes 717, the electrode 717 connected to the SMD 41d may be disposed along the side 71s1.

According to this configuration, the electrode 717 connected to the SMD 41d may be disposed close to the SMD 41d, achieving a reduction of the length of wiring connecting the SMD 41d to the electrode 717.

In addition, for example, in the radio-frequency module 1 according to the present embodiment, the second base 72 may have an electrode 724 disposed on the surface on the opposite side of the surface facing the first base 71.

According to this configuration, the second base 72 may cause heat to be discharged, from the surface on the opposite side of the first base 71, through the electrode 724 to the module substrate 90, achieving improvement of heat dissipation of the integrated circuit 70.

In addition, for example, in the radio-frequency module 1 according to the present embodiment, the second base 72 may have the multiple electrodes 724. Among the electrodes 724, the electrode 724 connected to the SMD 41d may be disposed closer to the SMD 41d than the other electrodes 724 are.

According to this configuration, the electrode 724 connected to the SMD 41d may be disposed close to the SMD 41d, achieving a reduction of the length of wiring connecting the SMD 41d to the electrode 724.

In addition, for example, in the radio-frequency module 1 according to the present embodiment, the circuit device directly connected to the power amplifier circuit 11 may be an impedance matching device. In addition, for example, in the radio-frequency module 1 according to the present embodiment, the impedance matching device may be an inductor or a capacitor.

According to this configuration, an impedance matching device, which is included in the impedance matching circuit 41 directly connected to the output end of the power amplifier circuit 11, may be included in the SMD 41d. This achieves a reduction of the wiring length between the power amplifier circuit 11 and the impedance matching circuit 41, and achieves reduction of wiring loss and mismatching loss due to the stray capacitance of wiring.

In addition, for example, in the radio-frequency module 1 according to the present embodiment, the power amplifier circuit 11 may include the circuit devices 721, each of which has the collector layer 721C, the base layer 721B, and the emitter layer 721E. The collector layer 721C, the base layer 721B, and the emitter layer 721E may be laminated in this sequence from the first base 71 side.

According to this configuration, wiring, to which each of the collector layer 721C, the base layer 721B, and the emitter layer 721E is connected, may be easily made in a manufacturing process. In addition, the area of the collector layer 721C is larger than the area of each of the base layer 721B and the emitter layer 721E in plan view. Therefore, joining the collector layer 721C to the first base 71 enables the joint area to be increased compared with the case in which the base layer 721B or the emitter layer 721E is joined to the first base 71. As a result, the joint between the first base 71 and the second base 72 is strengthened, achieving suppression of the state in which the second base 72 peels off from the first base 71.

In addition, for example, in the radio-frequency module 1 according to the present embodiment, the thermal conductivity of the first semiconductor material may be higher than that of the second semiconductor material.

According to this configuration, heat, which is generated by the power amplifier circuit 11 included in the second base 72, may be discharged to the first base 71 which is formed of the first semiconductor material having a thermal conductivity higher than the second semiconductor material of which the second base 72 is formed, enabling heat dissipation of the second base 72 to be promoted.

In addition, for example, in the radio-frequency module 1 according to the present embodiment, the first semiconductor material may be silicon or gallium nitride; the second semiconductor material may be gallium arsenide or silicon germanium.

According to this configuration, heat, which is generated by the power amplifier circuit 11 included in the second base 72, may be discharged to the first base 71 which is formed of silicon or gallium nitride having a thermal conductivity higher than gallium arsenide or silicon germanium of which the second base 72 is formed, enabling heat dissipation of the second base 72 to be promoted.

The communication device 5 according to the present embodiment includes the RFIC 3, which processes radio-frequency signals, and the radio-frequency module 1, which transports radio-frequency signals between the RFIC 3 and the antenna 2.

According to this configuration, the communication device 5 may have substantially the same effects as those of the radio-frequency module 1.

OTHER EMBODIMENTS

A radio-frequency module and a communication device, which are provided by the present disclosure, are described on the basis of the embodiment. The radio-frequency module and the communication device, which are provided by the present disclosure, are not limited to the embodiment described above. Other embodiments, which are embodied by combining any components in the embodiment, modified examples, which are obtained by making, on the embodiment, various changes conceived by those skilled in the art without necessarily departing from the gist of the present disclosure, and various devices, in which the radio-frequency module is built, are also encompassed in the present disclosure.

For example, in the embodiment described above, the radio-frequency module 1 is compatible with FDD bands. However, the present disclosure is not limited to this. For example, the radio-frequency module 1 may be compatible with TDD (Time Division Duplex) bands, or may be compatible with both FDD bands and TDD bands. In this case, the radio-frequency module 1 may have any configuration as long as the radio-frequency module 1 includes a filter circuit having a passband including a TDD band, and a switching circuit which switches between transmission and reception.

In the embodiment described above, the integrated circuit includes a single second base. However, the configuration is not limited to this. The integrated circuit may include two or more second bases.

INDUSTRIAL APPLICABILITY

The present disclosure may be widely used as a radio-frequency module, which is disposed in a front-end unit, in communication devices such as a cellular phone.

REFERENCE SIGNS LIST 1 radio-frequency module
2 antenna
3 RFIC
4 BBIC
5 communication device
11 power amplifier circuit
11A, 11B power amplifier
20, 70 integrated circuit
21 low-noise amplifier circuit
41, 42, 43, 44 impedance matching circuit
41$d$, 42$d$, 43$d$, 44$d$ SMD
51, 52, 53, 54, 55 switching circuit
61, 62 duplexer circuit
61R, 62R receive-filter circuit
61T, 62T transmit-filter circuit
71 first base
71$s$1, 71$s$2, 71$s$3, 71$s$4, 72$s$1, 72$s$2, 72$s$3, 72$s$4 side
72 second base
72$a$ semiconductor layer
72$b$ epitaxial layer
80 control circuit
90 module substrate
90$a$, 90$b$ principal surface
90$p$1, 90$p$2 wiring pattern
91 resin member
92 shield electrode layer
100 antenna connection terminal
111, 112 radio-frequency input terminal
121, 122 radio-frequency output terminal
130 control terminal
150 external connection terminal
711 silicon substrate
712, 714 silicon dioxide layer
713 silicon layer
715 silicon nitride layer
716, 717, 722, 723, 724 electrode
717$a$, 724$a$ columnar conductor
717$b$, 724$b$ bump electrode
718 resin layer
721, 7130 circuit device
721B base layer
721C collector layer
721E emitter layer
7140 via electrode

The invention claimed is:

1. A radio-frequency module comprising:
a module substrate that has a principal surface;
an integrated circuit that is on the principal surface and that comprises a power amplifier circuit; and
an electronic component that is on the principal surface and that comprises a circuit device directly connected to the power amplifier circuit,
wherein the integrated circuit comprises:
a first base that at least partly comprises a first semiconductor material, and
a second base that at least partly comprises a second semiconductor material different from the first semiconductor material and that comprises the power amplifier circuit,
wherein the first base has a first side and a second side that are opposite each other in a plan view of the module substrate,
wherein the electronic component is closer to the first side than to the second side in the plan view, and
wherein, in the plan view, the second base is smaller than the first base and is overlain by the first base at a position closer to the first side than to the second side.

2. The radio-frequency module according to claim 1, wherein the first base comprises an electric circuit.

3. The radio-frequency module according to claim 2, wherein the electric circuit is not between the second base and the first side in the plan view.

4. The radio-frequency module according to claim 2, wherein the electric circuit comprises a control circuit, a first switching circuit, or a second switching circuit, the control circuit being configured to control the power amplifier circuit, the first switching circuit being connected to an output end of the power amplifier circuit, and the second switching circuit being connected to an input end of the power amplifier circuit.

5. The radio-frequency module according to claim 2, wherein the electric circuit does not overlap the power amplifier circuit in the plan view.

6. The radio-frequency module according to claim 1, wherein the first base comprises a first electrode on a surface of the first base that faces the second base.

7. The radio-frequency module according to claim 6, wherein the first base comprises a plurality of first electrodes along an edge of the first base, and
wherein the plurality of first electrodes are not between the second base and the first side.

8. The radio-frequency module according to claim 7, wherein, one of the plurality of first electrodes is connected to the electronic component and is along the first side.

9. The radio-frequency module according to claim 1, wherein the second base comprises a second electrode on a surface of the second base that is opposite a surface that faces the first base.

10. The radio-frequency module according to claim 9, wherein the second base comprises a plurality of second electrodes, and
wherein one of the plurality of second electrodes is connected to the electronic component and is closer to the electronic component than the other second electrodes.

11. The radio-frequency module according to claim 1, wherein the circuit device is an impedance matching device.

12. The radio-frequency module according to claim 11, wherein the impedance matching device is an inductor or a capacitor.

13. The radio-frequency module according to claim 1,
wherein the power amplifier circuit comprises a circuit device having a collector layer, a base layer, and an emitter layer, and
wherein the collector layer, the base layer, and the emitter layer are laminated, the base layer being between the collector layer and the emitter layer, and the collector layer being closer to the first base than the base layer and the emitter layer.

14. The radio-frequency module according to claim 1, wherein the first semiconductor material has a thermal conductivity greater than the second semiconductor material.

15. The radio-frequency module according to claim 1,
wherein the first semiconductor material is silicon or gallium nitride, and
wherein the second semiconductor material is gallium arsenide or silicon germanium.

16. A communication device comprising:
a signal processing circuit configured to process a radio-frequency signal; and
the radio-frequency module according to claim 1 that is configured to transport the radio-frequency signal between the signal processing circuit and an antenna.

* * * * *